United States Patent

Gipp et al.

Patent Number: 5,449,234
Date of Patent: Sep. 12, 1995

[54] AIR TEMPERATURE SENSOR

[75] Inventors: Gregory H. Gipp, Peoria; Ronald R. Gustin, Washington, both of Ill.

[73] Assignee: Caterpillar Inc., Peoria, Ill.

[21] Appl. No.: 158,329

[22] Filed: Nov. 29, 1993

[51] Int. Cl.$^6$ .................. G01K 7/22; G01K 13/02; G01K 1/08

[52] U.S. Cl. .................. 374/185; 374/138; 374/148; 338/28; 338/22 R

[58] Field of Search ............. 374/208, 185, 138, 148; 338/28, 22 R

[56] References Cited

U.S. PATENT DOCUMENTS

| | | | |
|---|---|---|---|
| 2,496,806 | 2/1950 | Moffatt | 374/138 |
| 2,930,827 | 3/1960 | Schunke | 374/138 |
| 3,081,628 | 3/1963 | Salera | 374/138 |
| 3,754,201 | 8/1973 | Adams | 338/28 |
| 4,142,170 | 2/1979 | Blatter | 338/28 |
| 4,243,968 | 1/1981 | Scott | 338/28 |
| 4,246,787 | 1/1981 | Harper | 338/22 R |
| 4,547,079 | 10/1985 | Alamprese et al. | 374/138 |
| 4,575,705 | 3/1986 | Gotcher | 374/208 |
| 4,718,776 | 1/1988 | Gilland et al. | 374/208 |
| 4,832,599 | 5/1989 | Kung | 374/185 |
| 4,891,622 | 1/1990 | Llewellyn | 338/28 |
| 4,929,093 | 5/1990 | Suzuki et al. | 374/185 |
| 4,987,749 | 1/1991 | Baier | 338/28 |
| 5,008,775 | 4/1991 | Schindler et al. | 374/208 |
| 5,151,574 | 9/1992 | Urban | 338/28 |
| 5,302,934 | 4/1994 | Hart et al. | 338/22 R |
| 5,340,019 | 8/1994 | Bohan, Jr. et al. | 374/208 |

FOREIGN PATENT DOCUMENTS

| | | | |
|---|---|---|---|
| 2754090 | 6/1979 | Germany | 374/185 |
| 3127726 | 2/1983 | Germany | 374/185 |
| 0153084 | 12/1979 | Japan | 374/185 |
| 0047527 | 3/1986 | Japan | 374/208 |
| 0080021 | 4/1986 | Japan | 374/138 |
| 403108624 | 5/1991 | Japan | 338/22 R |
| 0737542 | 9/1955 | United Kingdom | 338/28 |
| 1150396 | 4/1969 | United Kingdom | 374/148 |

*Primary Examiner*—Diego F. F. Gutierrez
*Attorney, Agent, or Firm*—James R. Yee

[57] ABSTRACT

The present invention provides an apparatus for sensing the temperature of surrounding air. The apparatus is thermally isolated from the external environment and more accurately provides an indication of the medium temperature while providing fast response. The apparatus includes a temperature sensing device whose resistance varies with temperature and a conditioning circuit for measuring the resistance and producing an electrical signal which is insensitive to external resistive loading and which has a magnitude responsive to the sensed resistance. The apparatus includes a non-metallic housing which encapsulates the temperature sensitive device and the conditioning circuit. The housing forms a cage portion which surrounds the temperature sensing device and is adapted to protect and to provide air flow to the temperature sensing device.

9 Claims, 4 Drawing Sheets

AIR TEMPERATURE SENSOR

TECHNICAL FIELD

This invention relates generally to a temperature sensor which is adapted to provide an electrical indication of a sensed temperature and, more particularly, to an air temperature sensor having a sensing element and conditioning circuit packaged in a non-metallic housing.

BACKGROUND ART

Temperature sensors have numerous applications such as for determining the temperature of gases, for example, in automobile engine applications. Traditionally, most sensors have taken the form of sensing elements such as thermostats having switched outputs. However, with the advent of complex electronic engine controllers, it is desirable to provide an absolute indication of the sensed temperature rather than merely a switched output.

Hence, modern sensors typically incorporate passive devices such as thermistors, negative thermal coefficient devices (NTC) or positive thermal coefficient devices (PTC). The output of these passive devices is typically in the form of a resistance which varies with temperature. Extreme conditions such as water, thermal cycle, and vibration can lead to a degradation of the wiring harness used to connect the sensor to the engine controller. For example, moisture can induce conductivity between individual wires in the wiring harness and over time the resistance of the individual wires can change. Such wiring harness degradation can induce inaccuracies in the signal received by the engine controller.

Past sensors suffer from further disadvantages because they are typically constructed with metal housings. Known devices involve fitting the sensing element into a housing constructed of brass or other similar metals. The housing typically includes an exterior thread and a hexagonal portion enabling the device to be screwed into a reciprocal threaded aperture in an engine block, for example. One significant disadvantage of metal housings, and particularly those formed with a hexagonal nut portion, is that the metal acts as a heat sink and draws the heat away from the sensing element, thereby causing inaccurate temperature readings. Another significant disadvantage is that when heat is applied to the backend of the sensor, energy is conducted to the temperature sensing element, causing even greater inaccuracies.

Typically, the temperature sensing element is coated with a layer of epoxy and then exposed to the gas medium. The epoxy is intended to protect the element from damage from, for example, moisture, while not affecting the response of the element. However, testing has shown that moisture "follows" the surface of the wires connected to the element. Damage due to the moisture inevitably follows.

Temperature sensors designed to sense the temperature of gases are especially intolerant of external heat. Heat in other applications where the sensor is surrounded by liquid is transferred to the surrounding liquid. Thus, a sensor adapted for use in a gaseous environment must be able to handle without losing accuracy the additional energy that is not transferred away from or towards the sensor. In other words, a gas temp sensor must be more responsive and require less energy expense to heat the element.

The present invention is directed towards one or more of the problems discussed above.

DISCLOSURE OF THE INVENTION

In one aspect of the present invention, an apparatus for sensing the temperature of surrounding air is provided. The apparatus includes a temperature sensing device whose resistance varies with temperature and a conditioning circuit for measuring the resistance and producing an electrical signal which is insensitive to external resistive loading and which has a magnitude responsive to the sensed resistance. The apparatus includes a non-metallic housing which encapsulates the temperature sensitive device and the conditioning circuit. The housing forms a cage portion which surrounds the temperature sensing device and is adapted to protect and to provide air flow to the temperature sensing device.

BEST MODE FOR CARRYING OUT THE INVENTION

Figure 1:
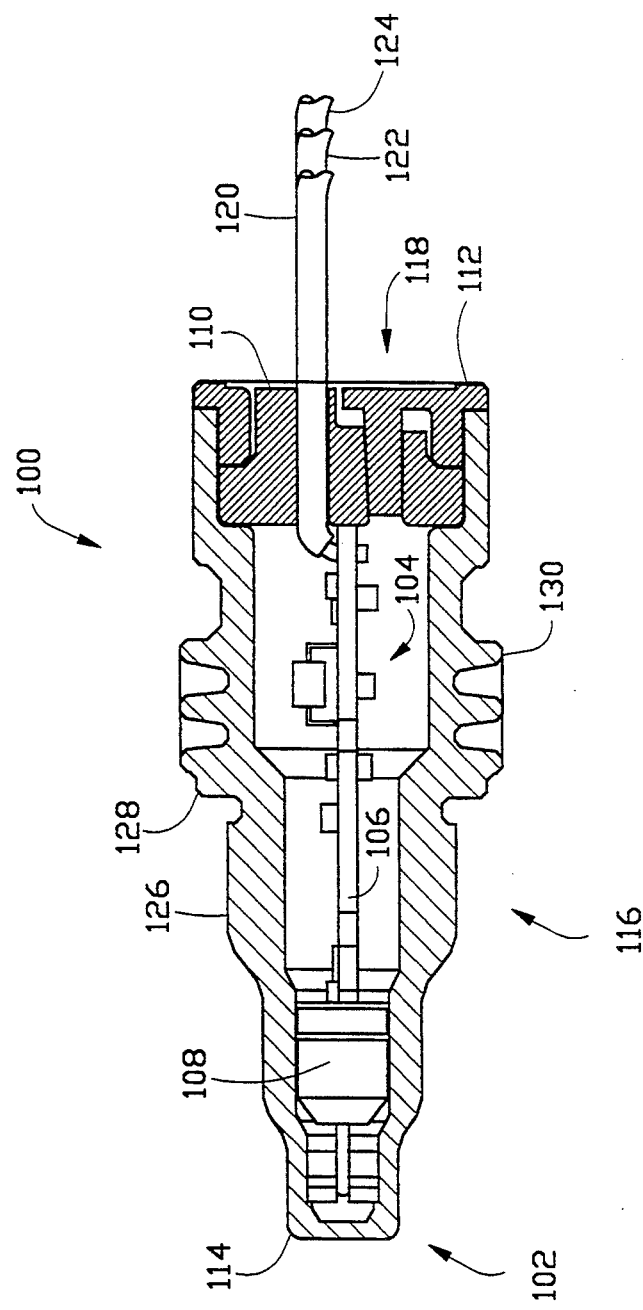
FIG. 1 is a diagrammatic illustration of a cutaway view of an air temperature sensor having a sensing element and a conditioning circuit packaged in a housing.

Referring now to the drawings, the present invention or air temperature sensor 100 will now be described.

The temperature sensor 100 includes a temperature sensing device 102 having a parameter which varies with temperature. Preferably, the temperature sensing device 102 includes a thermistor (see below) which has an electrical resistance which varies with temperature. The temperature sensor 100 also includes a conditioning circuit 104 which is electrically connected to the temperature sensing device 102. The conditioning circuit 104 is adapted to measure a resistance across the device 102 and produce an electrical signal which is insensitive to external resistive loading and which has a magnitude responsive to the sensed resistance. The conditioning circuit will be described in greater detail in connection with FIGS. 7 and 8 below.

The conditioning circuit 104 and the temperature sensing device 102 are mounted on a circuit board 106. Preferably, the condition circuit 104 is implemented using surface mounted components and designed using known practices in a manner which minimizes the board size and maximizes rejection of electromagnetic interference (EMI). The circuit board layout coupled with the use of ferrite inductors enables the sensor to operate correctly in field strengths of up to 100 V/m from 15 KHz to 1 GHz.

The temperature sensor 100 further includes a non-metallic, liquid resistant housing 114. The conditioning circuit 104 and the temperature sensing device 102 are enclosed in the non-metallic housing 114. The housing 114 includes a main body portion 116 and an integrally connectable cap portion 118. The entire housing 114 is formed by injection molding.

The housing 114 is preferably composed of a nylon containing glass fibers. Other fiber materials such a graphite fiber may be substituted for the glass fiber, as would be apparent to one skilled in the art. The percentage of fiber is selected based on the housing design and desired housing characteristics, and in the present application, the housing contains between 28 and 33 percent fiber material. In the preferred embodiment, the housing 114 is composed of 70% nylon and 30% glass fibers.

Figure 2:
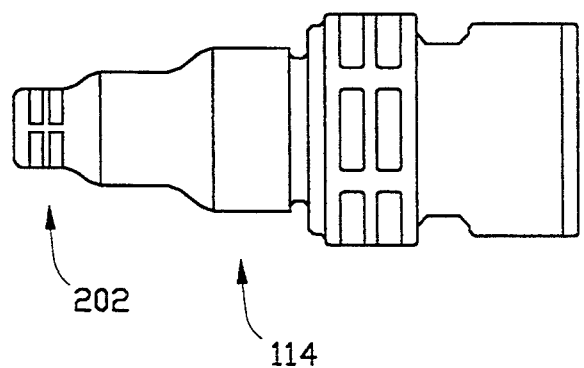
FIG. 2 is a diagrammatic view of the housing of FIG. 1.
Figure 3:
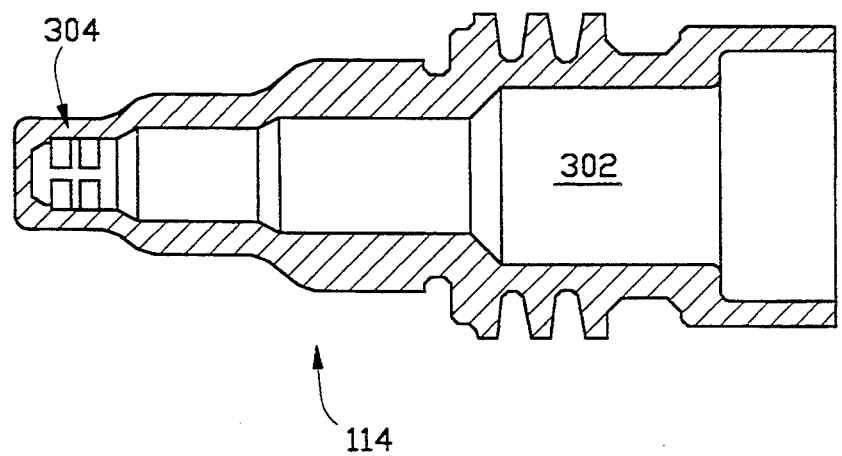
FIG. 3 is a diagrammatic view of a cross-sectional view of the housing of FIG. 1.

With reference to FIGS. 2 and 3, the housing 114 will now be described. The housing includes a cage portion 202. The cage portion 202 includes a number of air ports which permit adequate air flow to the temperature sensing device 102 to ensure that the response is matched to the actual air temperature. The cage portion 204 also provides protection to the temperature sensing device during shipping, installation and servicing. Additionally, the cage portion 202 prevents the temperature sensing device 102 from becoming loose or separated from the sensor 100 in case a portion of it breaks off.

With reference to FIG. 3, the housing 114 forms a cavity in the front portion of the sensor 304 and a cavity in the interior portion of the sensor 302.

The cavity in the interior portion of the sensor 302 is configured to receive the circuit board 106. During assembly, the circuit board 106 is inserted into interior portion 302. To facilitate more rapid assembly, the interior portion 302 has first and second grooves (not shown) which are adapted to receive the printed circuit board 106. Moreover, the edges of the circuit board 106 are beveled which help guide the circuit board 106 into the grooves during assembly.

During assembly, a predetermined amount of potting material is injected into the interior portion 302. A "soft" potting material such as 1265 Eccogel as manufactured by Emerson Cummings may be used. Preferably, the interior of the sensor is encapsulated with a "soft" epoxy to provide protection from vibrations. Silicone gel or epoxy gel are also suitable potting materials. It is critical that a "soft" potting material is used because a "hard" potting can crack or damage the surface mounted electronics during the thermal cycling. Additionally, a "hard" potting could cause stresses on the housing during thermal cycling. The potting material serves to restrict movement of the electronics during vibration and consequently reduces vibration related problems.

Returning to FIG. 1, a thermoplastic grommet 108 provides sealing between the front portion of the sensor 304 (front cavity) which is exposed to air and the interior portion of the sensor 302 (interior cavity) which contains the electrical circuit. A suitable thermoplastic is available from Advanced Elastomer Systems of Akron, Ohio under the tradename Santoprene. The grommet 108 also makes the sensor very robust in a high vibration environment due to the vibration dampening characteristics of Santoprene.

The thermoplastic grommet 108 also thermally isolates the temperature sensing element from the rest of the sensor, thus minimizing thermal conduction from the tip (heat sink), which maximizes response time. Additionally, the thermoplastic grommet 108 minimizes thermal conduction from the back end of the housing to the tip (heat soak), thus making the temperature reading a more accurate representation of the gas temperature rather than the external environment.

The back end of the sensor is sealed against moisture by the cap portion 118. In the preferred embodiment, the cap portion includes a compression grommet 110 and retainer 112. The compression grommet 110 is constructed of rubber or other like material, for example, Santoprene, and is inserted in the cavity behind the circuit board 106. The compression grommet 110 is constructed so as to conform to the cavity's configuration and forms three radial seals against moisture infiltration. The grommet 110 is held in compression by the retainer 112 which is secured to the housing 114 after the potting material is injected (see below). It is foreseeable that the housing 114 and the retainer 112 could be secured using a bonding material such as an epoxy or an adhesive; however, the two parts are preferably connected using ultrasonic welding. This process insures a complete and permanent connection between the two parts and is easy to use in a manufacturing environment. The welding of thee retainer creates a compressions seal on the outer diameter surface of the compression grommet 110 and a compression seal on the outer diameter of the electrical connecters 120,122,124. The post of the retainer 112 is inserted into the grommet aperture to seal the passage where the potting is injected.

In order to inject the potting material, the thermoplastic grommet 108 and compression grommet 110 are placed on the circuit board 106. The circuit board 106 and the thermoplastic grommet 108 are then placed into the interior cavity 302. The compression grommet 110 is also put into place. An orifice (not shown) in the compression grommet 110 allows injection of the soft potting material. The grommets 108,110 retains the potting material in the interior cavity 302. A plug (not shown) protrudes from the retainer 112 and seals the orifice.

At least one electrical connector 120,122,124 extends through the compression grommet 110 for connecting the conditioning circuit 104 to an external electrical circuit (not shown) such as an engine controller. In the preferred embodiment, three electrical conductors 120,122,124 are provided. A first electrical conductor 120 supplies a preselected voltage potential to the sensor 100. A second electrical conductor 122 is connected to system ground. The third electrical conductor 124 is connected to the conditioning circuit 104 for transmitting the sensor output signal to external electrical circuitry. The conductors 120,122,124 have been illustrated as insulated copper wiring; however, the conductors 120,122,124 could also be embodied in electrical terminals without departing from the scope of the present invention. The preferred conductors use a silicone block to prevent moisture from entering the sensor via an unsealed conductor.

The conductors 120,122,124 extend through individual apertures (not shown) in the compression grommet 110. The apertures are constructed to be smaller in diameter than the outside diameter of the conductors 120,122,124, thereby insuring proper seal against moisture infiltration. During assembly, the conductors 120,122,124 are inserted through the apertures and connected to the circuit board. The compression grommet 110 and the circuit board 106 are then inserted into the interior portion 302 simultaneously. Prior to insertion, the grommet 110 position is adjusted by sliding the grommet 110 along the conductors 120,122,124 so that further adjustment is not required after insertion. Potting is then injected to a specific amount. The cap portion 118 is then bonded to the housing 114 as set forth above. Compression of the grommet 110 during this step prevents moisture infiltration through the apertures and between the grommet 110 and housing 114.

Figure 4:
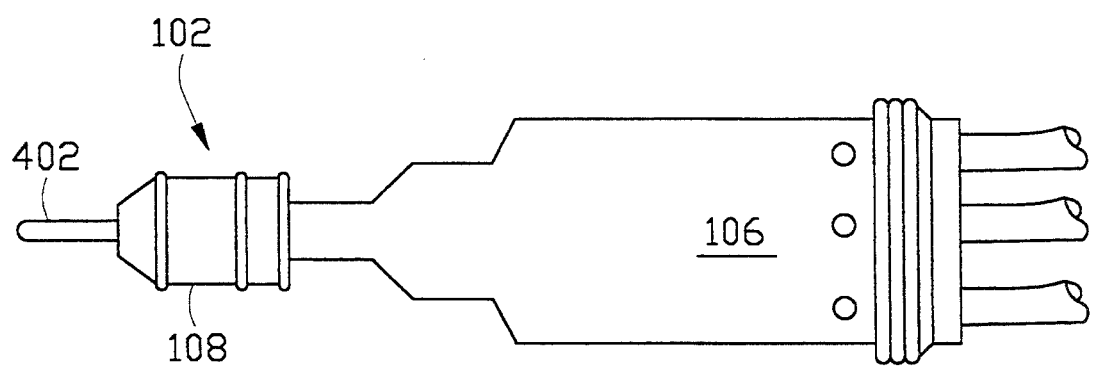
FIG. 4 is a diagrammatic view of the sensing element of FIG. 1 including a tubular portion, a thermoplastic grommet, and a compression grommet.
Figure 5:
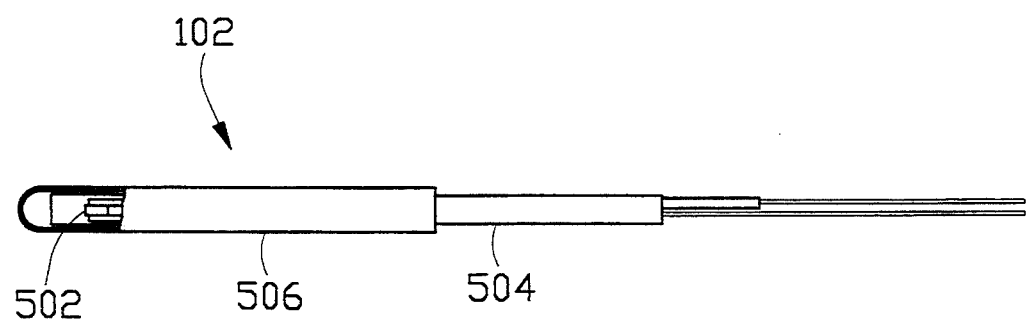
FIG. 5 is a diagrammatic view of the tubular portion of the sensing element of FIG. 4 having a thermistor.
Figure 6:
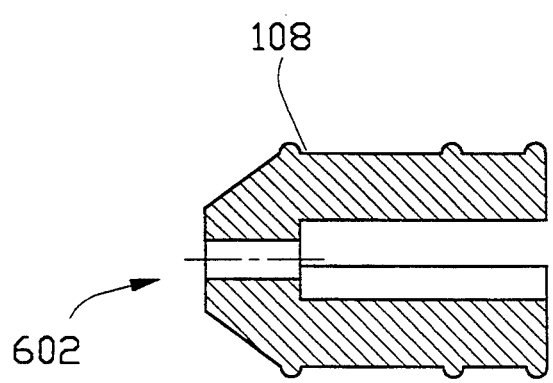
FIG. 6 is a cross-sectional view of the grommet of FIG. 4.

With reference to FIGS. 4–6, the temperature sensing device 102 will be described in more detail. With reference to FIG. 4, the temperature sensing device 102 includes a tubular portion 402. The tubular portion 402 is mounted to the circuit board 106 via the grommet 108.

A portion of the circuit board 106 fits into the grommet 108. The tubular portion 402 extends through and protrudes from an orifice 602 in the grommet 108. Preferably, the grommet is ribbed on the inside surface (not shown) and the outside surface (see FIG. 6) to effectuate the sealing. In the preferred embodiment, the orifice has a diameter of 0.030" (30/1000 inches).

With reference to FIG. 5, the tubular portion consists of a thermistor 502. Preferably, the thermistor 502 is micro-encapsulated in a rigid tube 504 using epoxy. The rigid tube 504 provides a surface for mounting to the circuit board 106. In the preferred embodiment, the rigid tube is composed of polyimide.

The tube and thermistor assembly is epoxied into a thin-walled metallic tube 506. In the preferred embodiment, the metallic tube 506 is composed of brass. A suitable epoxy is available from Emerson & Cuming of Woburn, Mass. under the product number 2850FT. Emerson & Cuming 2850FT epoxy has excellent thermal conductivity characteristics. Additionally, its thermal coefficient of expansion closely matches that of brass. Consequently, the potential for damage to the tip of the temperature sensing device as a result of multiple thermal cycles is minimized. The thin-walled brass tube 506 protects the thermistor from damage due to moisture or chemical interaction. Experience has shown that an unprotected element can readily be damaged, especially by moisture.

In the preferred embodiment, the length to diameter ratio of the tubular portion 402 is maximized. The maximum length to diameter ratio of the tubular portion 402 will be typically limited by the limits of existing manufacturing technology. One suitable process is called "deep drawing". Thus, in the preferred embodiment, the brass tube has an outer diameter of substantially 0.060" (60/1000 inches), an inner diameter of substantially 0.045" (45/1000 inches) and a length of at least 0.5". In the preferred embodiment, the rigid tube 502 has a diameter of 0.040" (40/1000 inches).

Maximization of the length to diameter ratio of the tubular portion increases the responsive of the temperature sensing device 102. Thus, the responsiveness of the sensor's readings more accurately depict the actual temperature of the surrounding air.

The housing 114 may be formed and configured so as to be received into an aperture (not shown) of an engine block (not shown). Once the sensor 100 is positioned in the aperture, the cage portion 202 of the housing 114, and hence the temperature sensing device 102, is in thermal communication with the interior of the aperture for sensing a temperature therein. The electrical conductors 120,122,124 extend outside the aperture for electrical connection to circuitry external to the aperture.

For this purpose, the housing 114 includes a cylindrical portion 126 which terminates in a shoulder portion 128. The shoulder portion 128 is configured to be larger in diameter than the aperture. The housing 114 extends into the aperture to a depth which is controlled by the shoulder portion 128. To ensure a proper seal, a rubber O-Ring (not shown) should be placed between the shoulder portion 128 and the engine block.

In some applications, it may be desirable to threadably engage the sensor 100 into a reciprocal threaded aperture. In such applications, the cylindrical portion 40 includes a threaded exterior portion (not shown). The threaded exterior portion allows the housing 114 to be screwed into a reciprocal threaded aperture in the engine block. The housing 114 also includes a hexagonal portion 130 which allows the housing 114 to be screwed into the aperture with sufficient torque via a torque wrench to prevent leakage and loosening due to vibration.

In other applications, it may be desirable to eliminate the threaded portion and form the cylindrical portion 126 with a smooth outer surface (as shown). In such an application, the depth to which the sensor 100 is inserted into the aperture could be controlled by the shoulder portion 128. A proper seal can be achieved by ensuring that the smooth outer surface has a diameter which requires that the housing 100 be forcibly fit into a soft aperture or through the use of a radial O-Ring seal.

Figure 7:
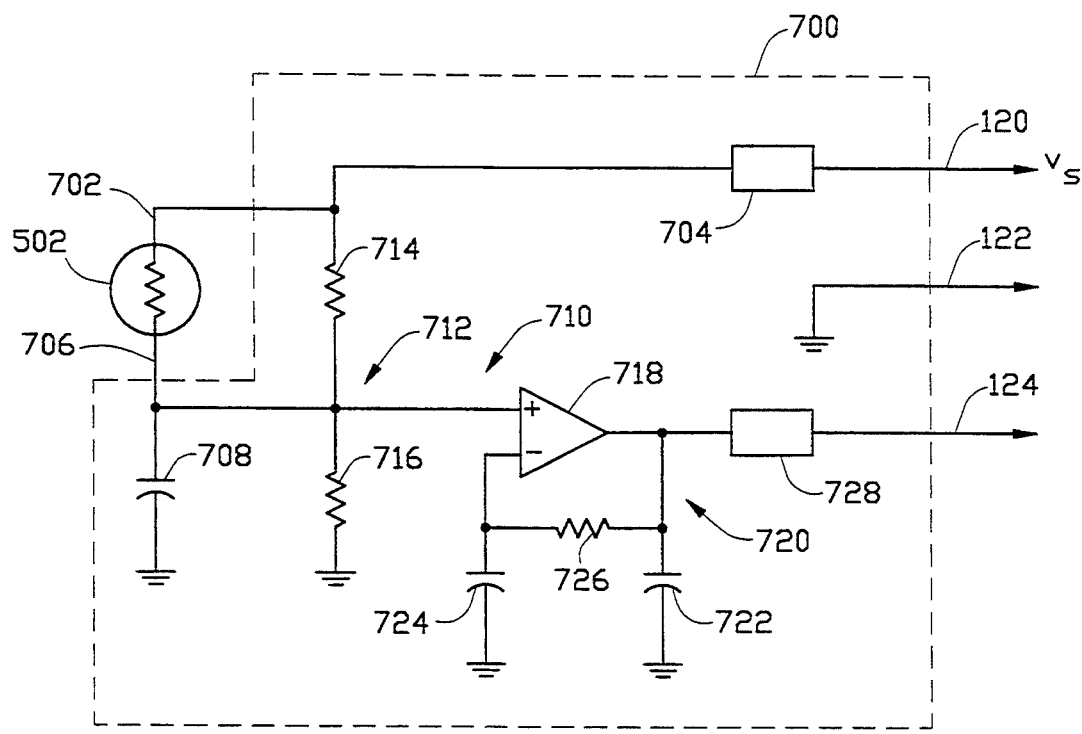
FIG. 7 is a circuit diagram of an air temperature sensor according to a first embodiment of the present invention.

Referring now to FIG. 7, a first embodiment of an electrical circuit 700 for practicing the immediate temperature sensor 100 will be described. A first terminal 702 of the thermistor 502 is connected to the first electrical conductor through an inductive filter 704 for receiving the preselected voltage potential $V_S$. The inductive filter 704 is provided to filter out electromagnetic interference (EMI) and radio frequency interference (RFI). A second terminal 706 of the thermistor 502 is connected to system ground through a first capacitor 708.

The resistance between the thermistor first and second terminals 702,704 varies as a function of the sensed temperature. A conditioning circuit 710 is provided for sensing the resistance across the thermistor 502 and producing an output signal which is insensitive to external resistive loading and is responsive to the sensed resistance. The conditioning circuit 710 includes a voltage divider network 712 which is adapted to sense the resistance across the thermistor 502 and responsively produce a signal having a voltage which is proportional to the sensed resistance. The voltage divider network 712 includes first and second resistors 714,716 serially connected between the preselected voltage potential $V_S$ and system ground. Moreover, the thermistor 502 is electrically connected in parallel with the first resistor 714 as shown. Hence the voltage drop across the first resistor 714 is proportional to the resistance of the thermistor 502 and the non linear response of the thermistor is smoothed into a fairly linear response which provides good resolution of the signal over a broad range of temperatures.

The junction of the first and second resistors 714,716 is connected to a non-inverting input terminal of an operational amplifier (op-amp) 718 for receiving the output voltage of the voltage divider network 712. An inverting input terminal of the op-amp 718 is connected to an output terminal of the op-amp through a voltage follower circuit 720. The op-amp 718 is a "rail-to-rail" CMOS op-amp. This is significant because, ordinary op-amps require 1.5 volt typical headroom (i.e., maximum output=$V_S$−1.5) which reduces sensor resolution when a small supply voltage $V_S$ is utilized. The voltage follower circuit 720 includes a second capacitor 722 connected between the op-amp output terminal and system ground. A third capacitor 724 is connected between the op-amp inverting input terminal and system ground. The follower circuit 720 further includes a third resistor 726 connected between the op-amp inverting input terminal and the op-amp output terminal. The op-amp output terminal is connected to the third electrical conductor 124 through a second inductive filter 728.

The op-amp 718 produces an output signal which has a magnitude proportional to the temperature sensed by the thermistor 502 and which is insensitive to the problems associated with wiring harness degradation. Specifically, the op-amp 718 provides an output signal having sufficient current to overcome resistive wiring harness loading. Moreover, the inductive filters 704,728 reduce the problems associated with EMI and RFI. Finally, the "active" conditioning circuit 710 is advantageous over passive sensors because the controller can readily be programmed to detect faulty operating conditions in the sensor. For example, if the signal line in a passive sensor is cut, the resistance of the wiring could be interpreted as a valid temperature signal. Moreover, even if the wire is not cut, significant resistive loading on the wiring harness could adversely affect sensor's output by shunting out the sensor's resistance. However, the conditioning circuit 710 of the first embodiment operates in a predefined voltage range and a controller can easily be programmed to interpret out of range voltages as faults.

Figure 8:
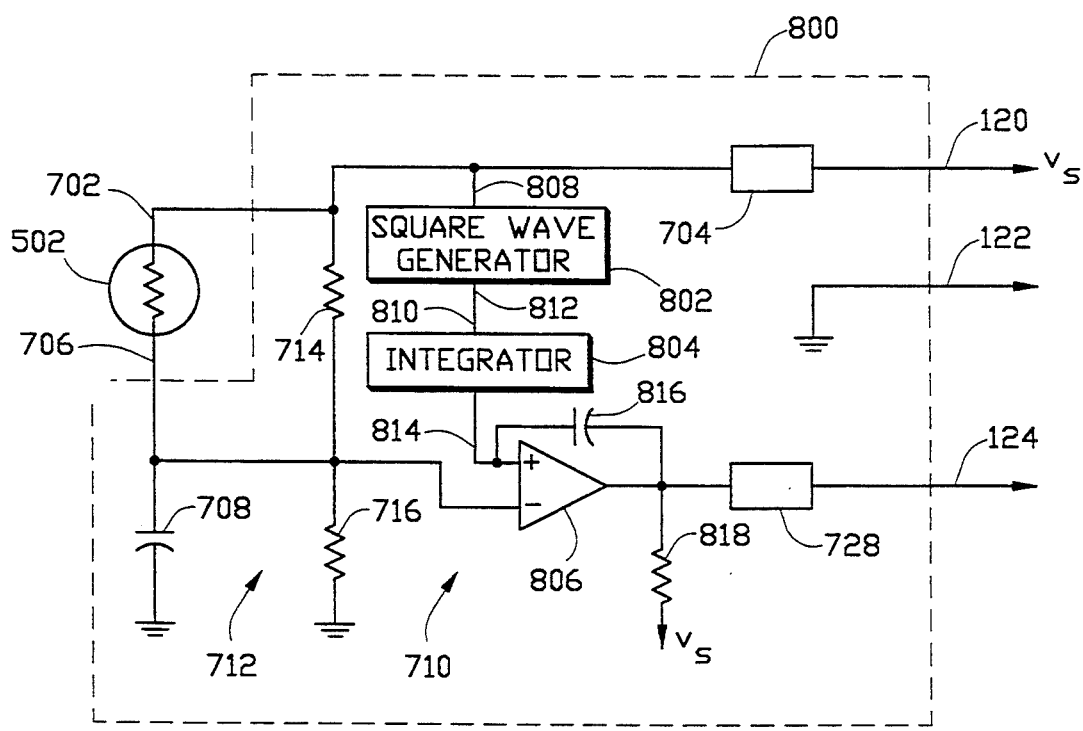
FIG. 8 is a functional block diagram of an air temperature sensor according to a second embodiment of the present invention.

Referring now to FIG. 8, a conditioning circuit 800 according to a second embodiment of present invention will be discussed. Like components in the first and second embodiments have been given the same element numbers and will not be discussed in further detail. In the second embodiment, the conditioning circuit 800 is adapted to produce a pulse-width-modulated output signal having a constant frequency and a duty cycle responsive to the sensed temperature.

The conditioning circuit 800 includes the voltage divider 712, a square wave generator 802, an integrator 804 and a comparator 806. The square wave generator 802 has an input terminal 808 connected to the first electrical conductor 120 and adapted to receive the preselected voltage potential $V_S$. The square wave generator 802 responsively produces a square wave signal having a predetermined amplitude and base frequency, as is common in the art. An input terminal 810 of the integrator is connected to an output terminal 812 of the square wave generator 802 and is adapted to receive the square wave signal. The integrator 804 integrates the square wave signal and responsively produces a sawtooth waveform signal having a predetermined amplitude and base frequency, as is common in the art. An output terminal 814 of the integrator 804 is connected to a non-inverting input terminal of the comparator 806 for delivering the square wave signal. The comparator 806 further has an inverting input terminal connected to the first and second resistors 714,716 and is adapted to receive the voltage divider output signal. A fourth capacitor 816 is connected between the comparator output terminal and the comparator non-inverting input terminal to provide AC hysterisis for noise immunity. The comparator 806 produces a signal at its output terminal in response to the voltage divider output and sawtooth waveform signals. More particularly, the comparator 806 produces a pulse-width-modulated (PWM) signal having a constant frequency and a duty factor responsive to the magnitude of the voltage divider output signal and thus the sensed temperature. A pull-up resistor 818 is connected between the comparator output terminal and a preselected voltage potential $V_1$. The pull-up resistor 818 biases the output terminal of the comparator 806 "high" whenever it is not internally pulled "low."

Industrial Applicability

The primary application of this invention is felt to lie in the automobile industry, but it is likely that many other applications exist where a sensing device is required to be mounted in an aperture for sensing the air temperature inside the aperture. In such an application, the housing can be configured having either a smooth or threaded exterior portion depending on design criteria. The sensor 100 is inserted into a reciprocal aperture in the engine block such that the cage portion 202 of the housing 114 is exposed to the air for which temperature is to be measured. The housing 114 is formed of a composition of nylon, or other like material, and glass fiber.

Once in place, the sensor 100 operates to produce an electrical signal which is responsive to the sensed air temperature and is insensitive to external resistive loading. This is accomplished by providing a conditioning circuit 700,800 which senses the resistance of the thermistor and "drives" an electrical output onto the third conductor 124. The third conductor 124 is in turn connected to an external electrical circuit, such as an engine controller, which utilizes the output signal for further processing.

Other aspects, advantages and objects can be obtained from a study of the drawings, the disclosure and the appended claims. While the present invention is described for use as a air temperature sensor in an engine it is recognized that such an apparatus could be adapted for determining air temperature in numerous other applications.

We claim:

1. An apparatus for sensing the temperature of a gas, comprising:

a temperature sensing device having a resistance which varies with temperature;

a conditioning circuit being electrically connected to said temperature sensing device and adapted to measure a resistance across said temperature sensing device and produce an electrical signal which is insensitive to external resistive loading and which has a magnitude responsive to the sensed resistance;

a tubular portion connected to said conditioning circuit, said temperature sensing device being encapsulated therein to prevent the gas from directly contacting said temperature sensing device;

a non-metallic housing encapsulating said tubular portion and said conditioning circuit, said housing forming an interior cavity and a front cavity, wherein said conditioning circuit is sealed within said interior cavity and said tubular portion is within said front cavity and said housing having a cage portion surrounding said tubular portion, said cage portion being adapted to protect and to provide gas flow to said tubular portion;

a circuit board being connected to said housing and being positioned within said interior cavity, said tubular portion being connected to said circuit board; and a grommet being compressibly connected between said tubular portion and said housing, said grommet providing sealing between said interior cavity and said front cavity.

2. An apparatus for sensing the temperature of a gas, comprising:

a temperature sensing device having a resistance which varies with temperature;

a conditioning circuit mounted on a circuit board and being electrically connected to said temperature sensing device and adapted to measure a resistance across said temperature sensing device and produce an electrical signal which is insensitive to external resistive loading and which has a magnitude responsive to the sensed resistance;

a tubular portion connected to said conditioning circuit, said temperature sensing device being encapsulated therein to prevent the gas from directly contacting temperature sensing device;

a non-metallic housing encapsulating said tubular portion and said conditioning circuit, said housing forming an interior cavity and a front cavity, wherein said conditioning circuit is sealed within said interior cavity and said tubular portion is within said front cavity and said housing having a cage portion surrounding said tubular portion, said cage portion being adapted to protect and to provide gas flow to said tubular portion; and, wherein said housing includes a main body portion and a cap portion, the main body portion forming said interior cavity, said interior cavity being adapted to receive said circuit board, said cap portion being adapted for insertion into the interior cavity, said cap portion being bonded to said main body portion, which is adapted to hold said cap portion in place with sufficient compression to form a seal against moisture infiltration between said cap portion and said main body portion.

3. An apparatus for sensing the temperature of a gas, comprising:

a thermistor having a resistance which varies with temperature;

a conditioning circuit being electrically connected to said thermistor and adapted to measure a resistance across the thermistor and produce an electrical signal which is insensitive to external resistive loading and which has a magnitude responsive to the sensed resistance;

a tubular portion connected to said conditioning circuit, said tubular portion including a rigid tube and a metallic tube, said thermistor being micro-encapsulated within said rigid tube, said rigid tube being encased by said metallic tube to prevent the gas from directly contacting said thermistor; and a non-metallic housing encapsulating said tubular portion and said conditioning circuit, said housing forming an interior cavity and a front cavity, wherein said conditioning circuit is sealed within said interior cavity and said tubular portion is within said front cavity and said housing having a cage portion surrounding said tubular portion, said cage portion being adapted to protect and to provide air flow to said tubular portion.

4. An apparatus as set forth in claim 3, wherein said rigid tube is composed of polyamide.

5. An apparatus as set forth in claim 1, wherein said metallic tube is composed of brass.

6. An apparatus as set forth in claim 1 wherein said housing is composed of nylon.

7. An apparatus as set forth in claim 6, wherein said housing is further composed of glass fibers.

8. An apparatus as set forth in claim 6, wherein said housing is composed of 28–33% glass fibers.

9. An apparatus as set forth in claim 3 wherein said tubular portion and said conditioning circuit are surface mounted on a circuit board.

* * * * *